(12) United States Patent
Lintz et al.

(10) Patent No.: US 8,984,558 B1
(45) Date of Patent: Mar. 17, 2015

(54) SYSTEM AND METHOD FOR TRANSITIONING VIDEO

(71) Applicant: Google Inc., Mountain View, CA (US)

(72) Inventors: Michael Lintz, Mountain View, CA (US); Chee Chew, Redmond, WA (US); Ray Su, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 7 days.

(21) Appl. No.: 13/893,999

(22) Filed: May 14, 2013

(51) Int. Cl.
*H04N 5/445* (2011.01)
*H04N 21/262* (2011.01)

(52) U.S. Cl.
CPC ............................... *H04N 21/26283* (2013.01)
USPC .................................. 725/41; 725/43; 725/44

(58) Field of Classification Search
CPC ... H04N 21/482; H04N 1/00161; G06F 3/048
See application file for complete search history.

(56) References Cited

U.S. PATENT DOCUMENTS

| | | | |
|---|---|---|---|
| 6,281,940 B1 * | 8/2001 | Sciammarella | 348/564 |
| 6,425,129 B1 * | 7/2002 | Sciammarella et al. | 725/38 |
| 8,065,628 B2 * | 11/2011 | Oshiro et al. | 715/788 |
| 8,385,426 B2 * | 2/2013 | Shen et al. | 375/240.25 |
| 2002/0032907 A1 * | 3/2002 | Daniels | 725/51 |
| 2006/0039481 A1 * | 2/2006 | Shen et al. | 375/240.25 |
| 2006/0279628 A1 * | 12/2006 | Fleming | 348/143 |
| 2007/0011702 A1 * | 1/2007 | Vaysman | 725/45 |
| 2008/0270449 A1 * | 10/2008 | Gossweiler et al. | 707/102 |
| 2009/0249393 A1 * | 10/2009 | Shelton et al. | 725/39 |

* cited by examiner

*Primary Examiner* — Pankaj Kumar
*Assistant Examiner* — Timothy Newlin

(57) ABSTRACT

Embodiments include storing, using one or more computing devices, at least one image associated with each of a plurality of videos. Embodiments may also include transmitting instructions configured to display a plurality of video interfaces, each of the plurality of video interfaces configured to display an initial image of one of the plurality of videos at a first time, the initial image being different at each of the plurality of video interfaces. Embodiments may also include allowing a first transition from a display of the initial image at the first time to a display of a second image at a second time at one of the plurality of video interfaces. Embodiments may further include allowing a second transition from a display of the initial image at the second time to a display of a third image at a third time at a second of the plurality of video interfaces.

19 Claims, 10 Drawing Sheets

SYSTEM AND METHOD FOR TRANSITIONING VIDEO

TECHNICAL FIELD

This disclosure relates to display of video and, more particularly, to a method of transitioning between different videos.

BACKGROUND

Transmission of videos over the internet has undergone a significant increase in popularity over the last few years. Prior to a user selecting a particular video to watch, many websites display still images that relate to that video.

SUMMARY OF DISCLOSURE

In one implementation, a method, in accordance with this disclosure, may include storing, using one or more computing devices, at least one image associated with each of a plurality of videos. The method may further include transmitting instructions configured to display a plurality of video interfaces, each of the plurality of video interfaces configured to display an initial image of one of the plurality of videos at a first time, the initial image being different at each of the plurality of video interfaces. The method may also include allowing a first transition from a display of the initial image at the first time to a display of a second image at a second time at one of the plurality of video interfaces. The method may further include allowing a second transition from a display of the initial image at the second time to a display of a third image at a third time at a second of the plurality of video interfaces, wherein the second transition begins prior to the end of the first transition.

In another implementation, a method, in accordance with this disclosure, may include storing, using one or more computing devices, at least one image associated with each of a plurality of videos. The method may further include transmitting instructions configured to display a plurality of video interfaces, each of the plurality of video interfaces configured to display an initial image of one of the plurality of videos at a first time, the initial image being different at each of the plurality of video interfaces. The method may also include allowing a first transition from a display of the initial image at the first time to a display of a second image at a second time at one of the plurality of video interfaces. The method may further include allowing a second transition from a display of the initial image at the second time to a display of a third image at a third time at a second of the plurality of video interfaces.

One or more of the following features may be included. In some embodiments, the method includes allowing a third transition from a display of the initial image at the third time to a display of a fourth image at a fourth time at a third of the plurality of video interfaces. In some embodiments, the second transition may begin prior to the end of the first transition and the third transition begins prior to the end of the second transition. The method may include allowing a fourth transition from a display of the initial image at the fourth time to a display of a fifth image at a fifth time at a fourth of the plurality of video interfaces. The method may also include allowing a fifth transition from a display of the initial image at the fifth time to a display of a sixth image at a sixth time at a fifth of the plurality of video interfaces. The method may also include allowing a sixth transition from a display of the initial image at the sixth time to a display of a seventh image at a seventh time at a sixth of the plurality of video interfaces. In some embodiments, the first video interface, the second video interface, and the third video interface may be aligned in a left-to-right arrangement. In some embodiments, the fourth video interface, the fifth video interface, and the sixth video interface may be aligned in a left-to-right arrangement. In some embodiments, the fourth video interface, the fifth video interface, and the sixth video interface may be aligned below the first video interface, the second video interface, and the third video interface. The initial image may be taken from a prior display of each of the plurality of videos.

In another implementation, a computing system is provided. In some embodiments, the computing system may include one or more processors configured to enable storage of at least one image associated with each of a plurality of videos, the one or more processors may be further configured to transmit instructions configured to display a plurality of video interfaces, each of the plurality of video interfaces configured to display an initial image of one of the plurality of videos at a first time, the initial image being different at each of the plurality of video interfaces. The one or more processors may be further configured to allow a first transition from a display of the initial image at the first time to a display of a second image at a second time at one of the plurality of video interfaces. The one or more processors may be further configured to allow a second transition from a display of the initial image at the second time to a display of a third image at a third time at a second of the plurality of video interfaces.

One or more of the following features may be included. In some embodiments, the one or more processors may be further configured to allow a third transition from a display of the initial image at the third time to a display of a fourth image at a fourth time at a third of the plurality of video interfaces. In some embodiments, the second transition may begin prior to the end of the first transition and the third transition begins prior to the end of the second transition. The one or more processors may be further configured to allow a fourth transition from a display of the initial image at the fourth time to a display of a fifth image at a fifth time at a fourth of the plurality of video interfaces. The one or more processors may be further configured to allow a fifth transition from a display of the initial image at the fifth time to a display of a sixth image at a sixth time at a fifth of the plurality of video interfaces. The one or more processors may be further configured to allow a sixth transition from a display of the initial image at the sixth time to a display of a seventh image at a seventh time at a sixth of the plurality of video interfaces. In some embodiments, the first video interface, the second video interface, and the third video interface may be aligned in a left-to-right arrangement. In some embodiments, the fourth video interface, the fifth video interface, and the sixth video interface may be aligned in a left-to-right arrangement. In some embodiments, the fourth video interface, the fifth video interface, and the sixth video interface may be aligned below the first video interface, the second video interface, and the third video interface.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Figure 1:
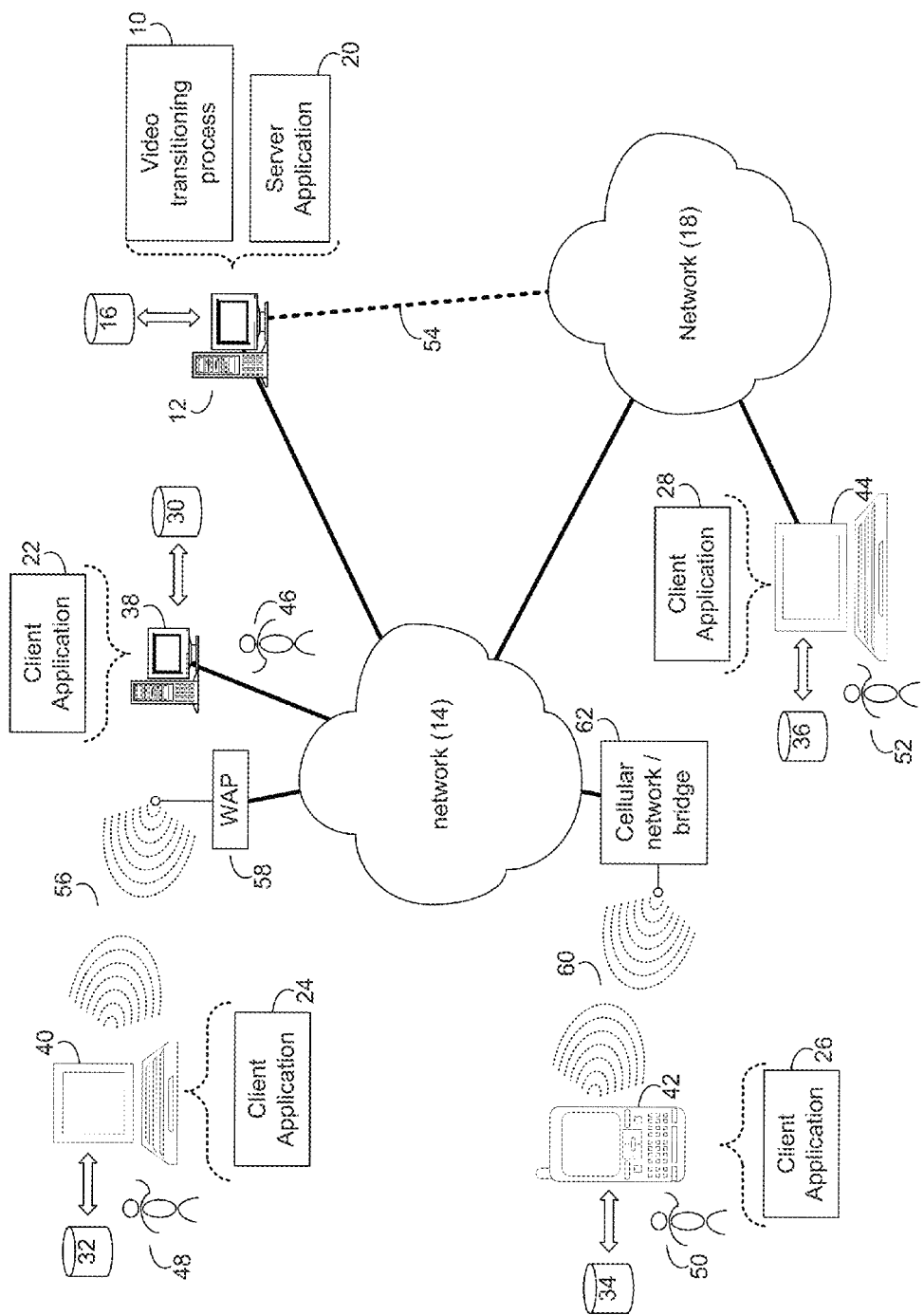
FIG. 1 is a diagrammatic view of a video transitioning process in accordance with an embodiment of the present disclosure.

Embodiments of the present disclosure are directed towards a system and method for transitioning between video displays. Accordingly, the video transitioning process described herein may be used to create an effect that indicates that the videos are live content and may also assist users so that they may view past images from the video.

Referring to FIGS. 1-10, there is shown a video transitioning process 10 that may reside on and may be executed by computer 12, which may be connected to network 14 (e.g., the Internet or a local area network). Server application may include some or all of the elements of video transitioning process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, video transitioning process 10 may include storing (1002), using one or more computing devices, at least one image associated with each of a plurality of videos. Video transitioning process 10 may also include transmitting (1004) instructions configured to display a plurality of video interfaces, each of the plurality of video interfaces configured to display an initial image of one of the plurality of videos at a first time, the initial image being different at each of the plurality of video interfaces. Video transitioning process 10 may further include allowing (1006) a first transition from a display of the initial image at the first time to a display of a second image at a second time at one of the plurality of video interfaces. Video transitioning process 10 may also include allowing (1008) a second transition from a display of the initial image at the second time to a display of a third image at a third time at a second of the plurality of video interfaces.

The instruction sets and subroutines of video transitioning process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Video transitioning process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), a television with one or more processors embedded therein or coupled thereto, and a dedicated network device (not shown).

One or more of client applications 22, 24, 26, 28 may be configured to effectuate some or all of the functionality of video transitioning process 10. Accordingly, video transitioning process 10 may be a purely server-side application, a purely client-side application, or a hybrid server-side/client-side application that is cooperatively executed by one or more of client applications 22, 24, 26, 28 and video transitioning process 10.

Users 46, 48, 50, 52 may access computer 12 and video transitioning process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking service. For example, the client devices 38, 40, 42, 44 can execute web browser applications that can be used to access the social networking service. In another example, the client devices 38, 40, 42, 44 may execute software applications that are specific to the social network (e.g., social networking "apps" running on smartphones).

The users 46, 48, 50, and 52 may participate in the social networking service provided by server device 12 by posting information, such as text comments (e.g., updates, announcements, replies), digital photos, videos, or other appropriate electronic information. In some implementations, information can be posted on a user's behalf by systems and/or services external to the social network or the server device 12. For example, the user 46 may post a review of a movie to a movie review website, and with proper permissions that website may cross-post the review to the social network on the user's 46 behalf. In another example, a software application executing on a mobile device, with proper permissions, may use global positioning system (GPS) capabilities to determine the user's location and automatically update the social network with his location (e.g., "At Home", "At Work", etc.).

Figure 2:
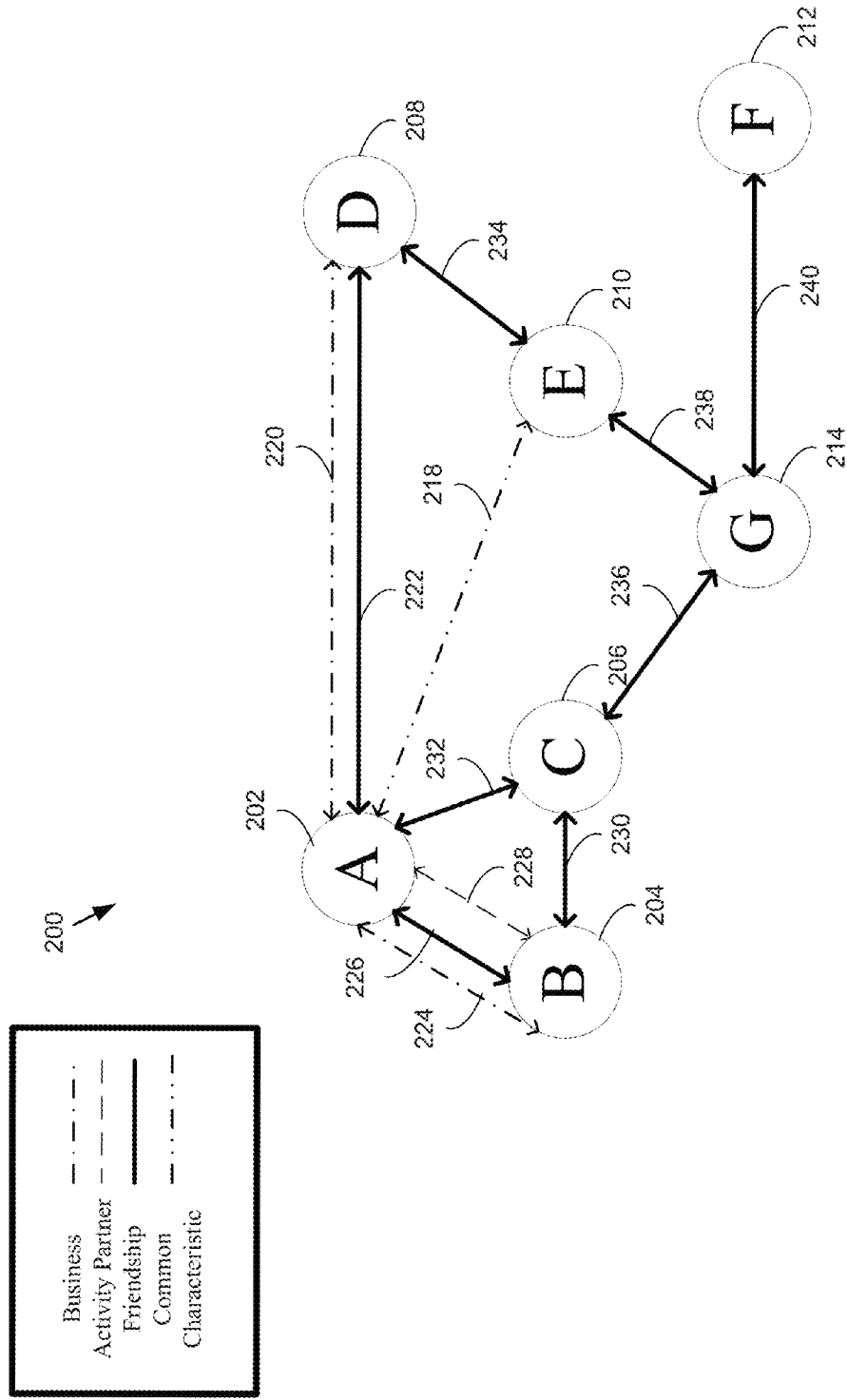
FIG. 2 is a diagrammatic view of a social network in accordance with an embodiment of the present disclosure.

Referring now to FIG. 2, a diagram of a social network 200 according to one embodiment of the present disclosure is provided. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, 234, 236, 238, and 240. The vertices 202, 204, 206, 208, 210, 212, and 214 may comprise profiles A, B, C, D, E, F, and G respectively.

As used herein, the phrase "social network profile" may refer to a member profile of a member of the social network 200. According to another embodiment, one or more of the vertices may represent a community. The methods and systems discussed below are equally applicable to an embodiment where the vertices may comprise one or more communities, but for purposes of illustration, the vertices depicted in FIG. 2 represent member profiles. The example network 200 shown in FIG. 2 has seven members. Considerably more members may be part of the social network 200. A member may be an entity such as, for example, a person, an organization, a business, a corporation, a community, a fictitious person, or other suitable entity.

In some embodiments, each member profile may contain entries, and each entry may comprise information associated with a profile. For example, a person's member profile may contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A particular business member profile may, for example, contain a description of the business, and information about its market sector, customer base, location, suppliers, net profits, net worth, number of employees, stock performance, contact information, and other types of suitable information associated with the business.

A member profile may also contain rating information associated with the member. For example, the member can be rated or scored by other members of the social network 200 in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. This membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used. Each member may be given the opportunity to opt out from providing any information that the member does not wish to share.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

In some embodiments, an association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may then accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Associations between profiles within a social network can be of a single type or can be multiple types and can include, for example, friendship associations, business associations, family associations, community associations, school associations, or any other suitable type of link between profiles. Associations may further be weighted to represent the strength of the association. For example, a friendship association can be weighted more than a school association. Each type of association can have various levels with different weights associated with each level. For example, a friendship association may be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

As discussed above, one or more of users 46, 48, 50, 52 may access computer 12 and video transitioning process 10 through network 14 or secondary network 18. For example, and for illustrative purposes only, assume that user 46 (i.e., the user of personal computer 38) wishes to use video transitioning process 10. User 46 may access video transitioning process 10 through client application 22 associated with personal computer 38. In this way, video transitioning process 10 may operate as a standalone application or alternatively as an applet or plug-in operating within a separate program such as server application 20. In some embodiments, server application 20 may include a social networking application. Although, this particular example focuses upon user 46 and personal computer 38 it should be noted that this disclosure is not meant to be limited to this particular example as laptop computer 40, smart phone 42, notebook computer 44, etc., may also be used to access and/or render some or all of the embodiments of video transitioning process 10 described herein.

Figure 3:
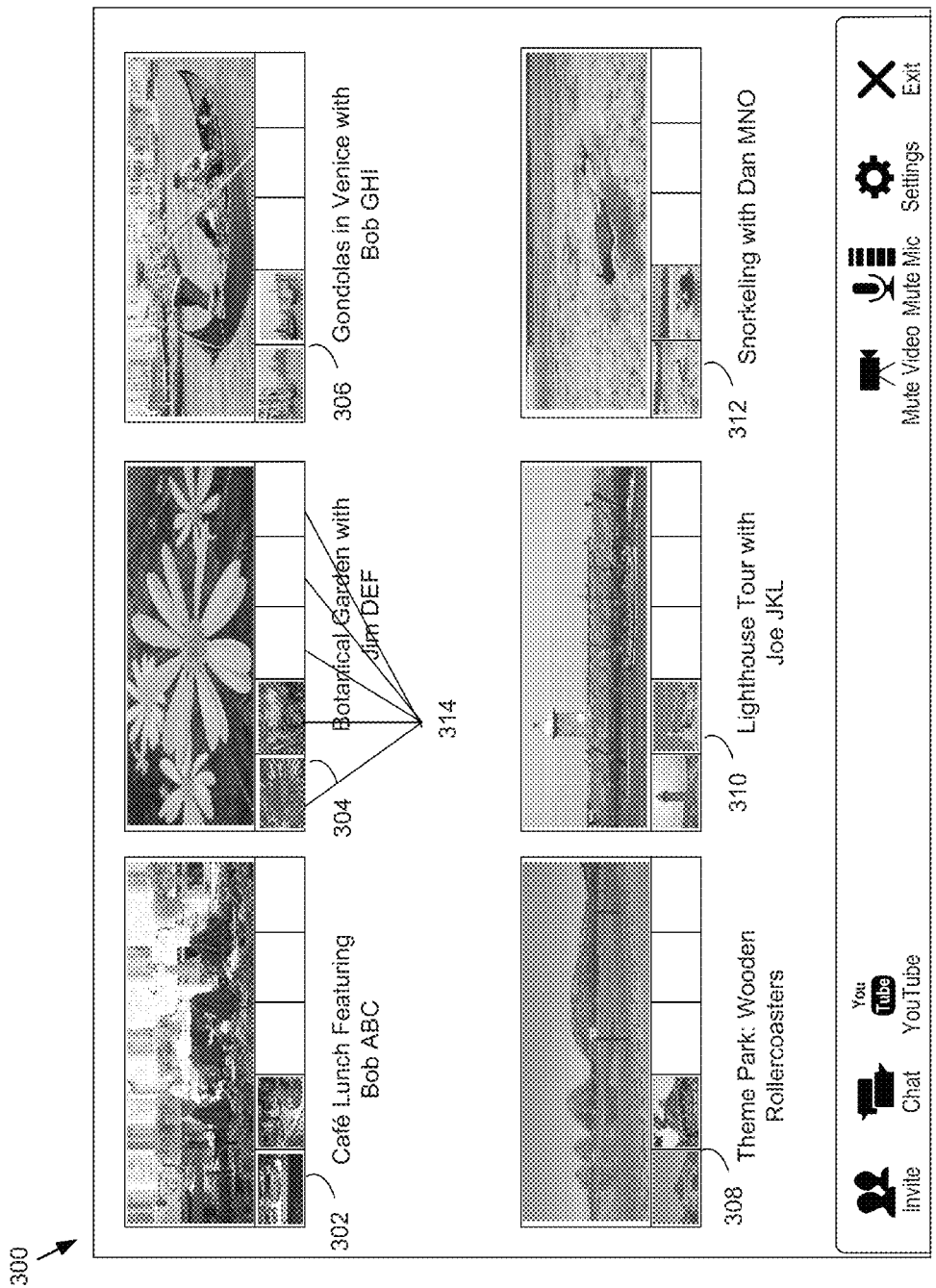
FIG. 3 is a diagrammatic view of an interface rendered by the video transitioning process of FIG. 1 in accordance with an embodiment of the present disclosure.

As such, and referring now to FIG. 3, when user 46 accesses server application 20 (e.g. social networking application) via client application 22 interface 300 may be rendered at personal computer 38. Interface 300 may include one or more video interfaces (e.g. 302, 304, 306, 308, 310, 312) each of which may be configured to display video, still images, audio, etc.

In this particular example, video interface 302 may display a cached still image of "Café Lunch featuring Bob ABC", video interface 304 may display a cached still image of "Botanical Garden with Jim DEF", video interface 306 may display a cached still image of "Gondolas in Venice with Bob GHI", video interface 308 may display a cached still image of "Theme Park: Wooden Rollercoasters", video interface 310 may display a cached still image of "Lighthouse Tour with Joe JKL", and video interface 312 may display a cached still image of "Snorkeling with Dan MNO".

In some embodiments, the video interfaces may be displayed in any particular order. For example, based upon the date/time of the video event, in an order of interest to the user (e.g. based upon the user's social network, connections, interests, etc), etc. Although, six video interfaces are shown in this particular example it should be noted that any number may be displayed without departing from the scope of the present disclosure.

As shown in FIGS. 3-9, each video interface may have video identification information associated therewith. For example, video interface 302 may provide the title of the video, in this example, "Café Lunch featuring Bob ABC". Similarly, video interfaces 304, 306, 308, 310, and 312 may each include corresponding identification information.

In some embodiments, a server computing device such as computer 12 may host a plurality of videos, which may be transmitted over networks (e.g. networks 14 and 18 shown in FIG. 1) and may be broadcast at various computing devices (e.g. 38, 40, 42, 44, etc.). Embodiments of video transitioning process 10 may be used to generate a transition between video displays. Accordingly, video transitioning process 10 may be used to create an effect that indicates that the videos are live content and may also assist users so that they may view past images from the video. In some embodiments, video transitioning process 10 may be used to create a grid of video objects, each displaying a still image from the video. In this way, several still frames from each video may be stored in memory. Video transitioning process 10 may periodically perform a cascade effect where the first video crossfades from the current image or thumbnail to one of the cached images over a short period of time. Before the transition finishes, a similar transition may be performed on the next video object in the grid, and so on for each video object. Accordingly, video transitioning process 10 may enable a cascade of transitions left-to-right top-to-bottom through the grid.

Referring again to FIG. 3, video transitioning process 10 may include storing (1002) at least one image associated with each of a plurality of videos. For example, still images associated with each of the video interfaces shown in FIG. 3 may be stored in one or more computing devices such as computer 12 shown in FIG. 1. In some cases, the still images may be taken from portions of the video that have already been played. Any number of images may be stored (e.g. in cache memory) without departing from the scope of the present disclosure.

In some embodiments, video transitioning process 10 may transmit (1004) instructions configured to display a plurality of video interfaces. For example, video interfaces 302, 304, 306, 308, 310, 312. In some embodiments, each of the plurality of video interfaces 302, 304, 306, 308, 310, 312 may be configured to display an initial image of one of the plurality of videos at a first time as shown in FIG. 3. The initial image at each of the plurality of video interfaces 302, 304, 306, 308, 310, 312 may be different as each video may be directed towards separate subject matter.

Figure 4:
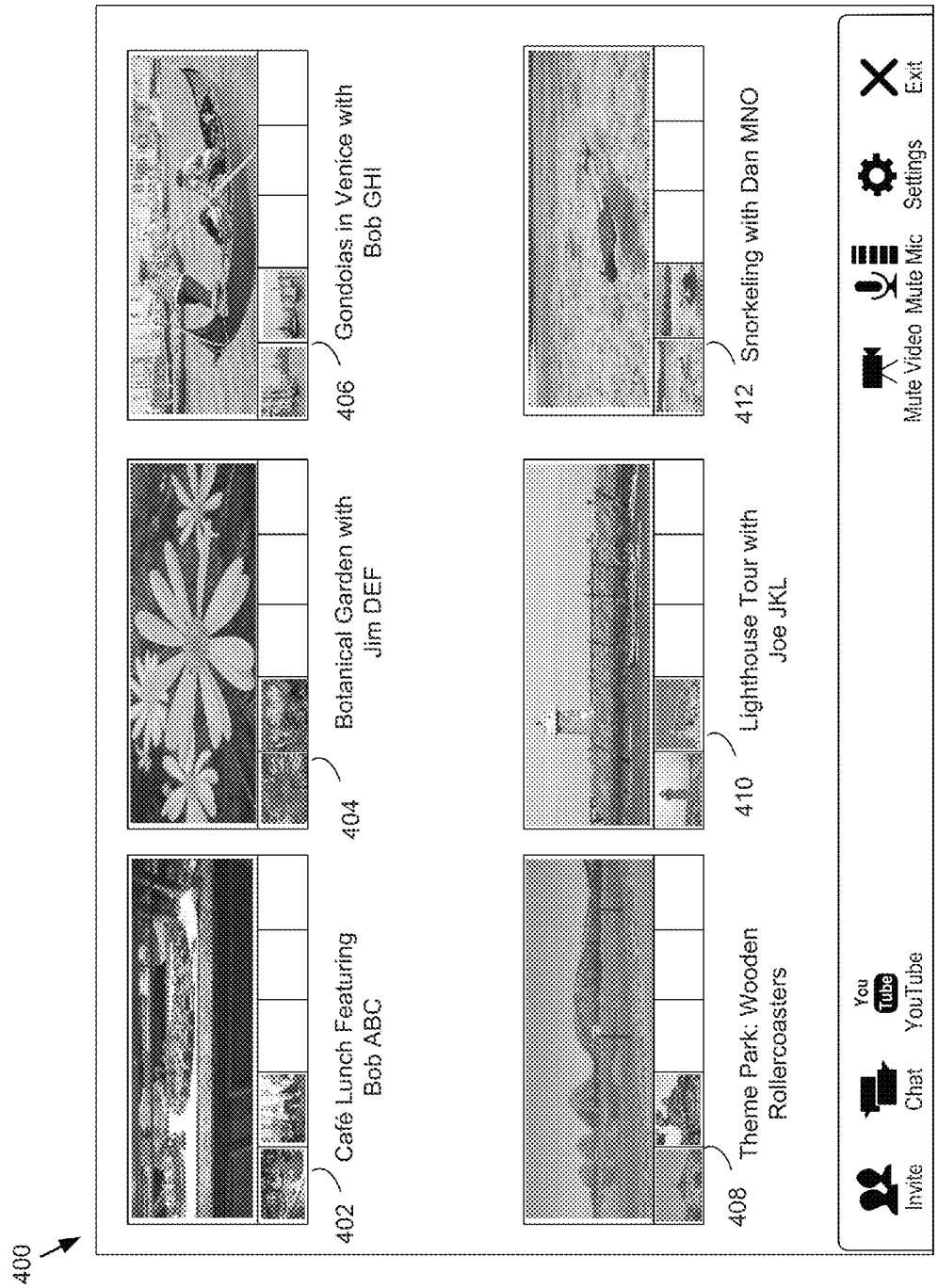
FIG. 4 is a diagrammatic view of an interface rendered by the video transitioning process of FIG. 1 in accordance with an embodiment of the present disclosure.

In some embodiments, video transitioning process 10 may allow (1006) a first transition from a display of the initial image at the first time to a display of a second image at a second time at one of the plurality of video interfaces. For example, video interface 302 depicts an initial image at a first time depicted in FIG. 3. However, video interface 402 in FIG. 4 shows how the initial image may be replaced with a second image at a second time. In this way, video transitioning process 10 may be configured to allow for the display of the initial image in video interface 302 and as time goes on this image may change to that shown in video interface 402.

Figure 5:
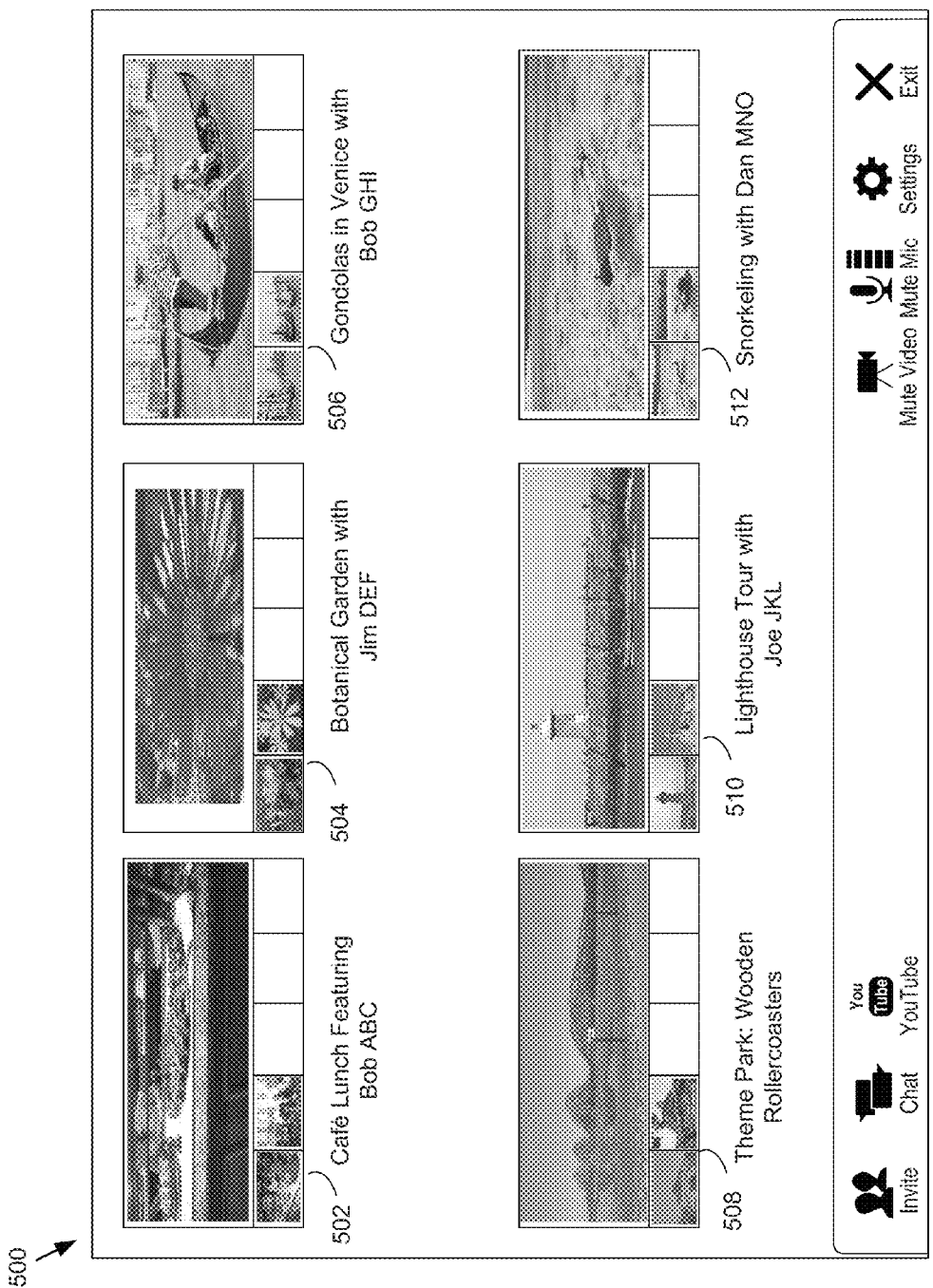
FIG. 5 is a diagrammatic view of an interface rendered by the video transitioning process of FIG. 1 in accordance with an embodiment of the present disclosure.
Figure 6:
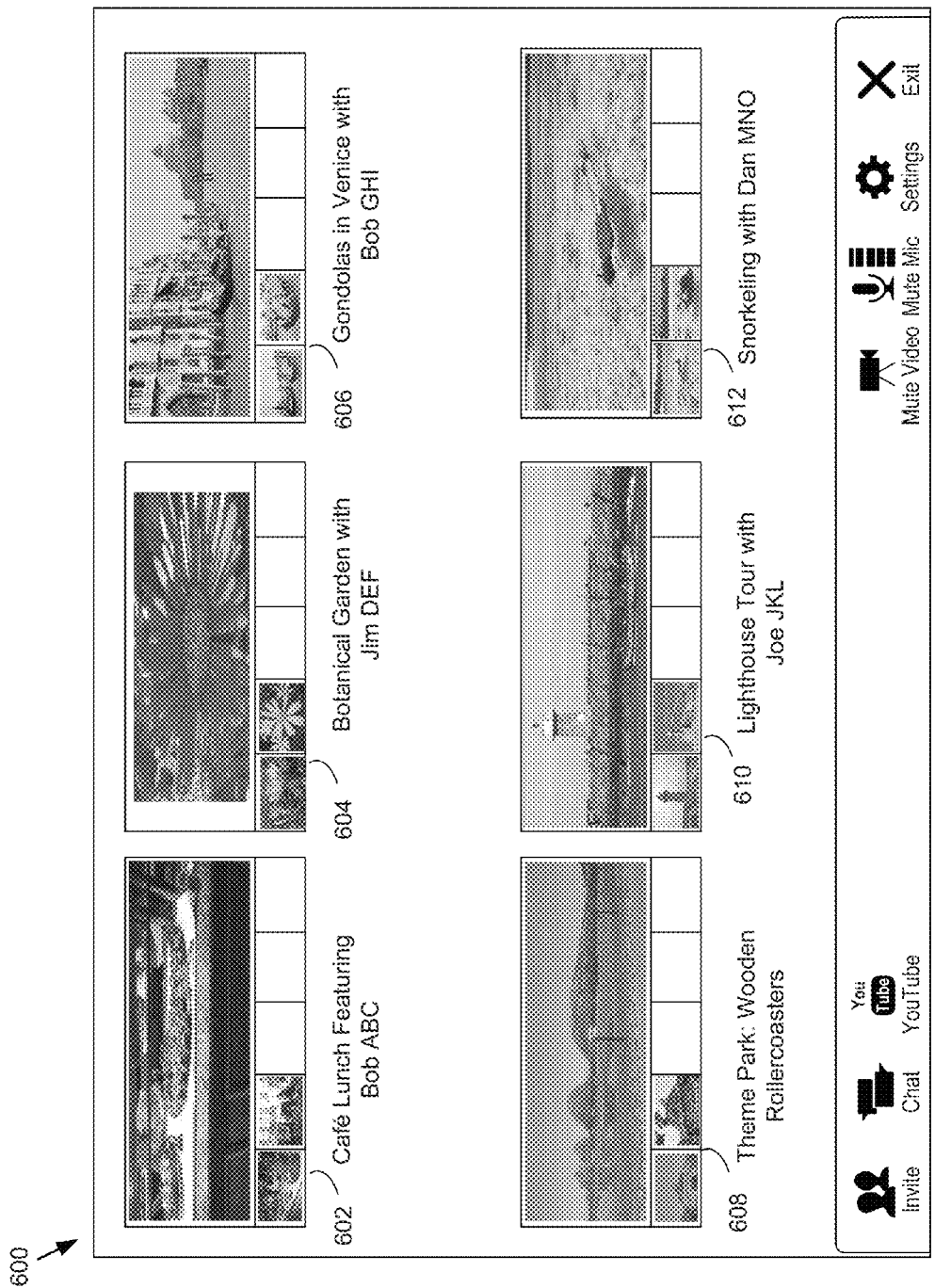
FIG. 6 is a diagrammatic view of an interface rendered by the video transitioning process of FIG. 1 in accordance with an embodiment of the present disclosure.
Figure 7:
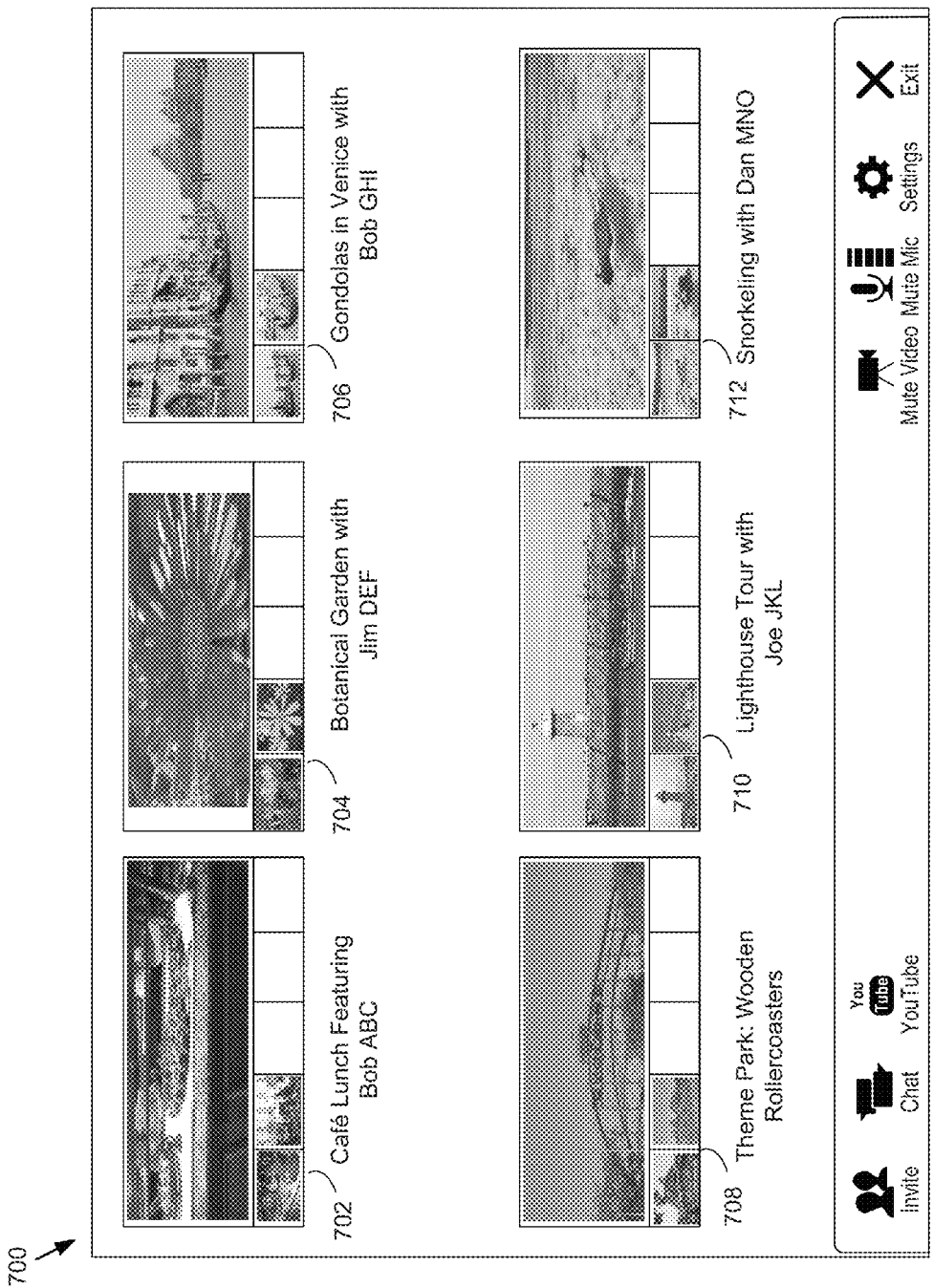
FIG. 7 is a diagrammatic view of an interface rendered by the video transitioning process of FIG. 1 in accordance with an embodiment of the present disclosure.
Figure 8:
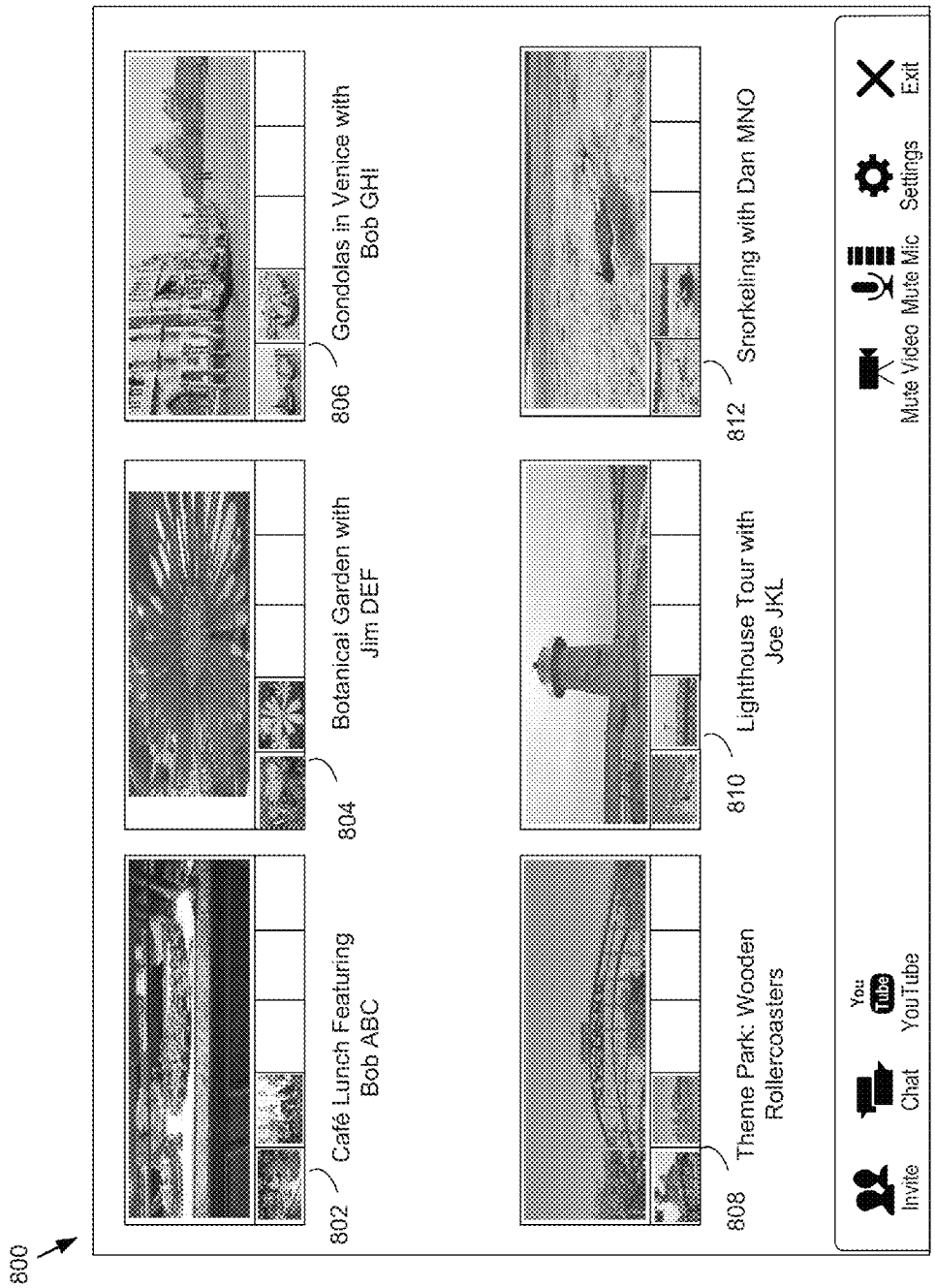
FIG. 8 is a diagrammatic view of an interface rendered by the video transitioning process of FIG. 1 in accordance with an embodiment of the present disclosure.
Figure 9:
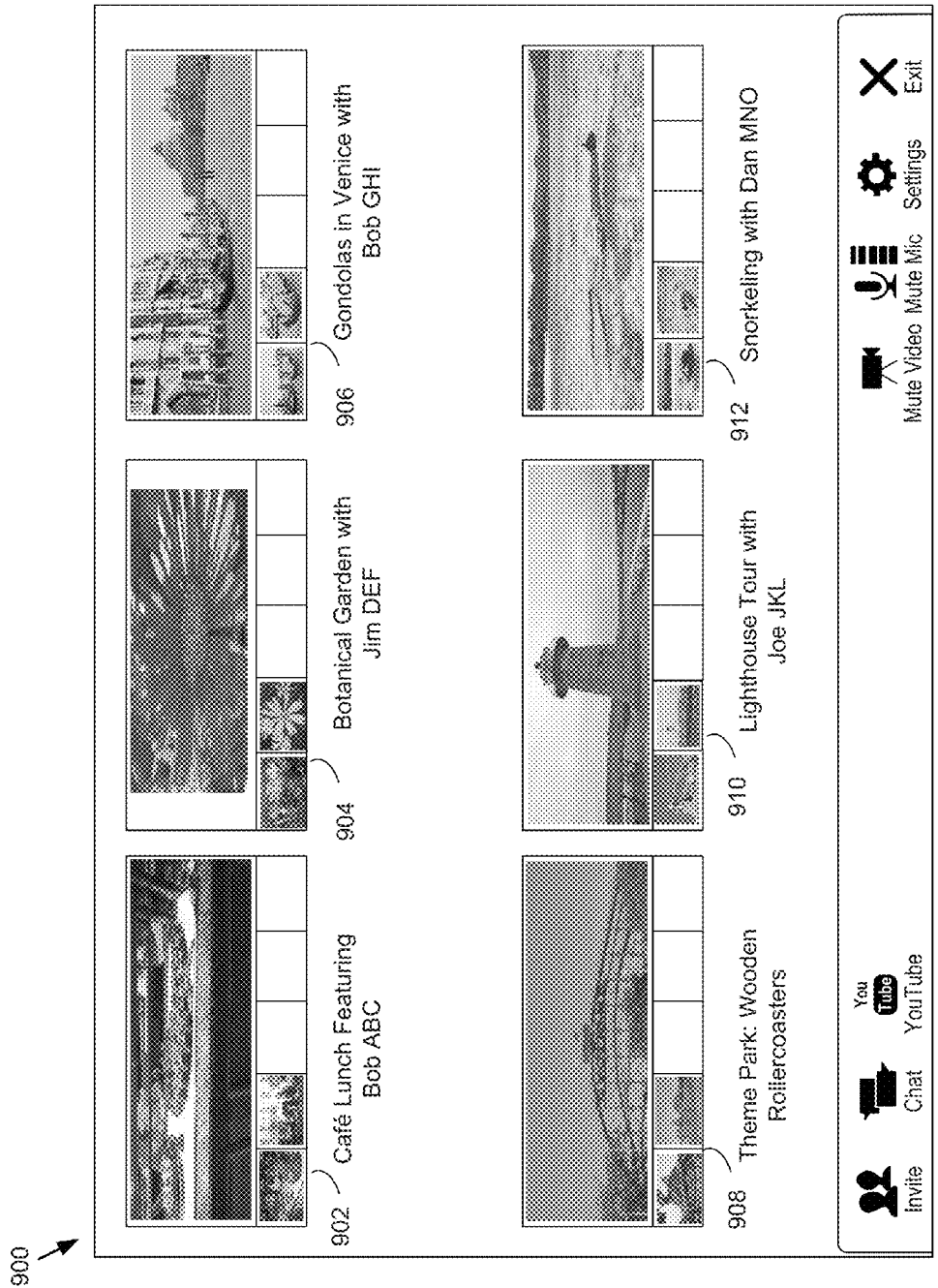
FIG. 9 is a diagrammatic view of an interface rendered by the video transitioning process of FIG. 1 in accordance with an embodiment of the present disclosure.
Figure 10:
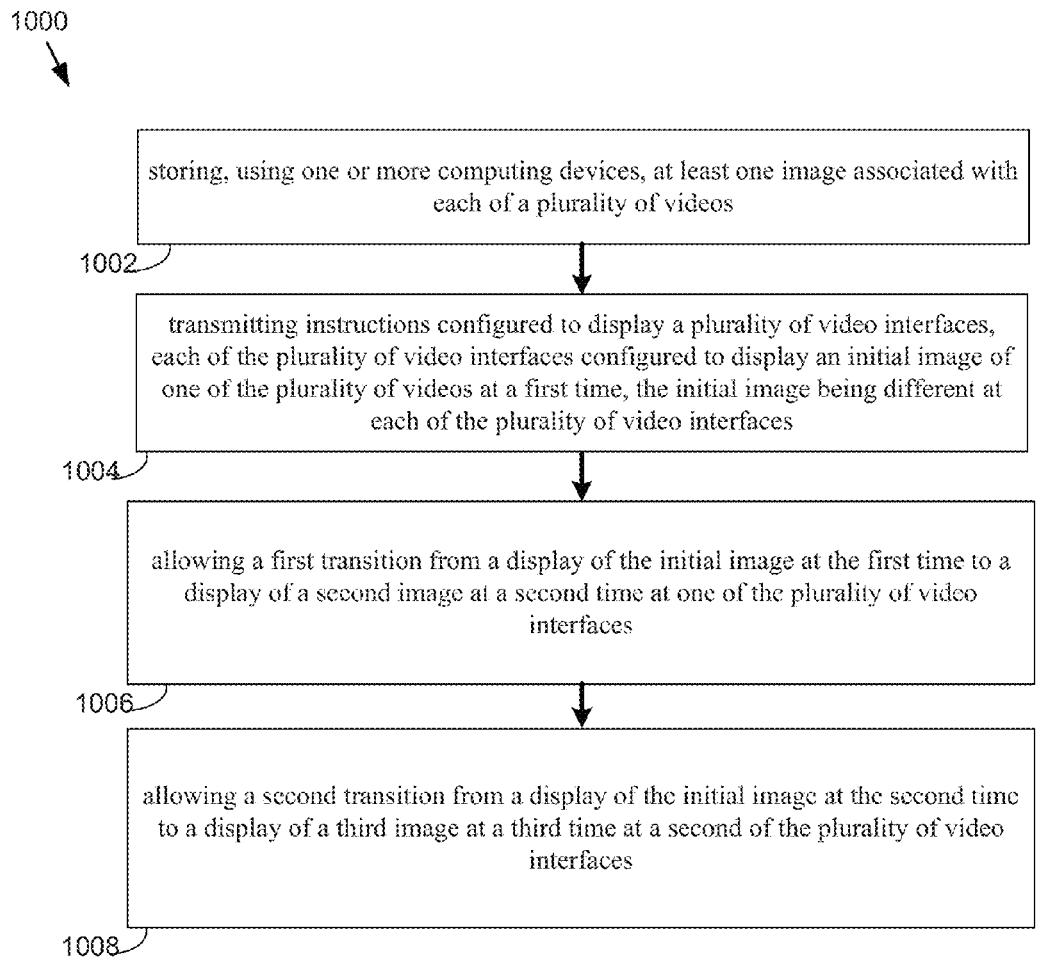
FIG. 10 is a flowchart of the video transitioning process of FIG. 1 in accordance with an embodiment of the present disclosure.

Similarly, video transitioning process 10 may be configured to allow for a second transition with regard to video interface 404 and 504. In this particular example, a display of the initial image of video interface 404 at the second time is shown in FIG. 4. After transitioning, a display of a third image at a third time is shown in FIG. 5. Transitions between images of each of the remaining video interfaces are shown in FIGS. 6-9.

In some embodiments, the following transition may begin prior to the end of the first transition. For example, the second transition (e.g. the transition from the image shown in video interface 404 to the image shown in video interface 504) may begin prior to the end of the first transition (e.g. the transition from the image shown in video interface 402 to the image shown in video interface 502).

In some embodiments, each of the video interfaces may undergo a similar transition. For example, the image shown in video interface may 302 may transition to show the image shown in video interface 402, the image shown in video interface may 404 may transition to show the image shown in video interface 504, the image shown in video interface may 506 may transition to show the image shown in video interface 606, etc. In some embodiments, the time between transitions may be uniform and each subsequent transition may begin prior to the end of the prior transition. This results in a visual cascading effect, as presented to the user.

Additionally and/or alternatively, in some embodiments, the order of the transitioning of the video interfaces may be occur in any direction, e.g. in a left to right transition, top to bottom transition, left to right followed by top to bottom, etc. For example, and referring again to FIG. 3, the order of the transition may flow from left to right with regard to video interfaces 302, 304, and 306 and then from top to bottom from video interface 306 to video interface 308 before transitioning to video interfaces 310 and 312.

In some embodiments, each of the video interfaces may include a display of each image, which may be shown in addition to the primary image shown within each video interface. For example, and as shown in FIGS. 3-9, various images 314 are shown below the primary still image shown within each video interface. These images may correspond to future or past transitional images. Although FIGS. 3-9 show five distinct windows within which these images may be provided it should be noted that any number and of windows may be provided. Further, these transitional images may be displayed in any suitable manner (e.g. different shapes, configurations, etc.).

In some embodiments, some or all of the user devices described herein may be electronically coupled to an electronic communication session. For example, the electronic communication session may be server application 20 running on server computing device 12. In this way, user devices, 38, 40, 42, 44, 500 may communicate with server application 20 via one or more networks, for example, network 14, 18, etc.

The present disclosure is not intended to be limited to the example provided above as any number of video interfaces may be used without departing from the scope of the present disclosure. Further, the arrangement of videos is not limited to the grid arrangement shown in FIGS. 3-9 as any arrangement of videos is possible.

Additionally and/or alternatively, any number of participants may be included within the electronic communication session. And some or all of the participants may be participating in the session using any suitable mode of communication. Accordingly, multiple synchronous and asynchronous communication messages may be transmitted of any modality type and any number of modality conversions may occur during a particular electronic communication session.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    storing, using one or more computing devices, at least one image associated with each of a plurality of videos;
    transmitting instructions configured to display a plurality of video interfaces, each of the plurality of video interfaces configured to display an initial image of one of the plurality of videos at a first time, the initial image being different at each of the plurality of video interfaces;
    allowing a first transition from a display of the initial image at the first time to a display of a second image at a second time at one of the plurality of video interfaces; and
    allowing a second transition from a display of the initial image at the second time to a display of a third image at a third time at a second of the plurality of video interfaces, wherein the second transition begins prior to the end of the first transition.

2. The computer-implemented method of claim 1, further comprising:
    allowing a third transition from a display of the initial image at the third time to a display of a fourth image at a fourth time at a third of the plurality of video interfaces.

3. The computer-implemented method of claim 2, wherein the third transition begins prior to the end of the second transition.

4. The computer-implemented method of claim 2, further comprising:
    allowing a fourth transition from a display of the initial image at the fourth time to a display of a fifth image at a fifth time at a fourth of the plurality of video interfaces.

5. The computer-implemented method of claim 4, further comprising:
    allowing a fifth transition from a display of the initial image at the fifth time to a display of a sixth image at a sixth time at a fifth of the plurality of video interfaces.

6. The computer-implemented method of claim 5, further comprising:
    allowing a sixth transition from a display of the initial image at the sixth time to a display of a seventh image at a seventh time at a sixth of the plurality of video interfaces.

7. The computer-implemented method of claim 1, wherein the first video interface, the second video interface, and the third video interface are aligned in a left-to-right arrangement.

8. The computer-implemented method of claim 7, wherein the fourth video interface, the fifth video interface, and the sixth video interface are aligned in a left-to-right arrangement.

9. The computer-implemented method of claim 8, wherein the fourth video interface, the fifth video interface, and the sixth video interface are aligned below the first video interface, the second video interface, and the third video interface.

10. The computer-implemented method of claim 1, wherein the initial image is taken from a prior display of each of the plurality of videos.

11. A computing system, comprising:
    one or more processors configured to enable storage of at least one image associated with each of a plurality of videos, the one or more processors further configured to transmit instructions configured to display a plurality of video interfaces, each of the plurality of video interfaces configured to display an initial image of one of the plurality of videos at a first time, the initial image being different at each of the plurality of video interfaces, the one or more processors further configured to allow a first transition from a display of the initial image at the first time to a display of a second image at a second time at one of the plurality of video interfaces, the one or more processors further configured to allow a second transition from a display of the initial image at the second time to a display of a third image at a third time at a second of the plurality of video interfaces, wherein the second transition begins prior to the end of the first transition.

12. The computing system of claim 11, wherein the one or more processors are further configured to allow a third transition from a display of the initial image at the third time to a display of a fourth image at a fourth time at a third of the plurality of video interfaces.

13. The computing system of claim 12, wherein the third transition begins prior to the end of the second transition.

14. The computing system of claim 12, wherein the one or more processors are further configured to allow a fourth transition from a display of the initial image at the fourth time to a display of a fifth image at a fifth time at a fourth of the plurality of video interfaces.

15. The computing system of claim 14, wherein the one or more processors are further configured to allow a fifth transition from a display of the initial image at the fifth time to a display of a sixth image at a sixth time at a fifth of the plurality of video interfaces.

16. The computing system of claim 15, wherein the one or more processors are further configured to allow a sixth transition from a display of the initial image at the sixth time to a display of a seventh image at a seventh time at a sixth of the plurality of video interfaces.

17. The computing system of claim 11, wherein the first video interface, the second video interface, and the third video interface are aligned in a left-to-right arrangement.

18. The computing system of claim 17, wherein the fourth video interface, the fifth video interface, and the sixth video interface are aligned in a left-to-right arrangement.

19. The computing system of claim 18, wherein the fourth video interface, the fifth video interface, and the sixth video interface are aligned below the first video interface, the second video interface, and the third video interface.

* * * * *